United States Patent

Theuerkauf

[15] 3,645,638
[45] Feb. 29, 1972

[54] METHOD AND APPARATUS FOR CUTTING THREADS

[72] Inventor: Fred Theuerkauf, Naples, Fla.
[73] Assignee: The Pipe Machinery Company, Wickliffe, Ohio
[22] Filed: Sept. 8, 1970
[21] Appl. No.: 70,111

[52] U.S. Cl............................408/1, 408/153, 408/169, 10/111, 10/120.5
[51] Int. Cl...............B23g 1/00, B23g 5/10, B23g 1/02, B23g 1/22
[58] Field of Search.................10/1 R, 96, 102, 111, 120, 10/120.5; 408/1, 147, 153, 168, 169, 170, 165, 217–222

[56] References Cited

UNITED STATES PATENTS

| | | | |
|---|---|---|---|
| 1,625,830 | 4/1927 | Smith | 10/111 |
| 1,978,248 | 10/1934 | Brehmer | 408/1 |
| 2,616,103 | 11/1952 | Stecher | 408/1 |
| 2,679,057 | 5/1954 | Sawdey | 10/120.5 |
| 2,768,393 | 10/1956 | Sayce | 408/1 |
| 2,954,570 | 10/1960 | Couch | 408/153 |
| 2,996,736 | 8/1961 | Benninghoff | 10/120.5 |
| 3,570,330 | 3/1971 | Cupler | 408/1 |

Primary Examiner—Charles W. Lanham
Assistant Examiner—E. M. Combs
Attorney—John Harrow Leonard

[57] ABSTRACT

A series of individual single tooth thread cutting tools are rotated concurrently about the axis of a pipe and are applied in cutting relation thereto in succession, at the same starting point, by movement radially of the pipe in a time delay relation to each other. They are maintained in cutting relation concurrently until they advance near to the end of the portion to be threaded. They are then retracted from the pipe in succession in the same order in which they were engaged with the pipe, in the same time delay relation to each other, all at the same location endwise of the pipe and substantially the same location circumferentially of the pipe.

14 Claims, 9 Drawing Figures

INVENTOR.
Fred Theuerkauf,
BY John H Leonard
ATTORNEY.

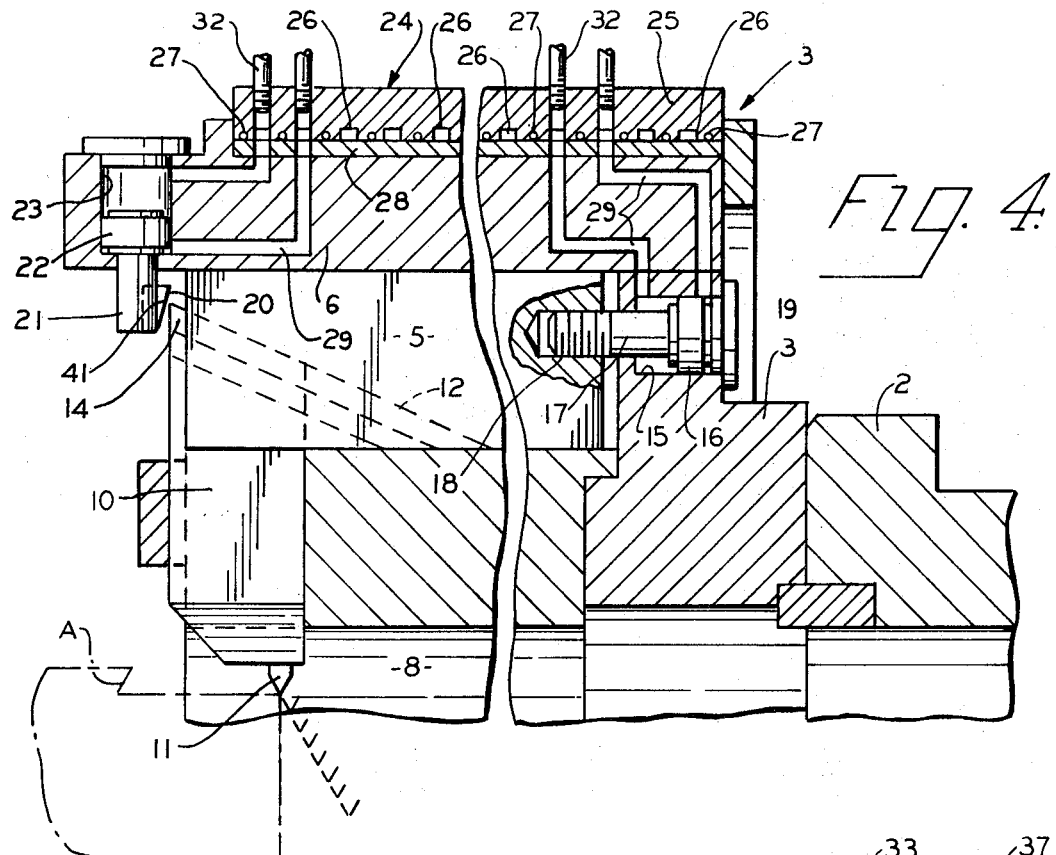
Fig. 4.
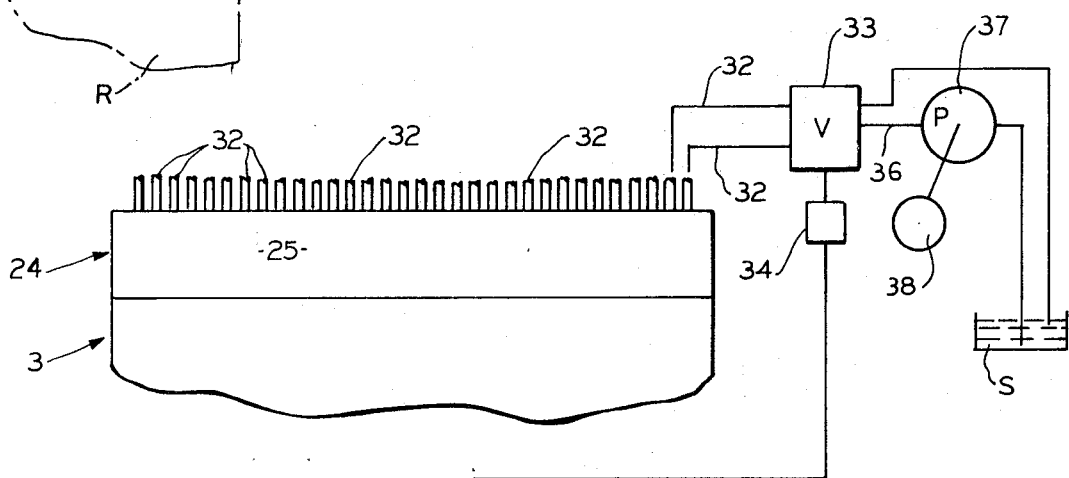
Fig. 5.
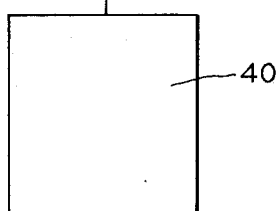

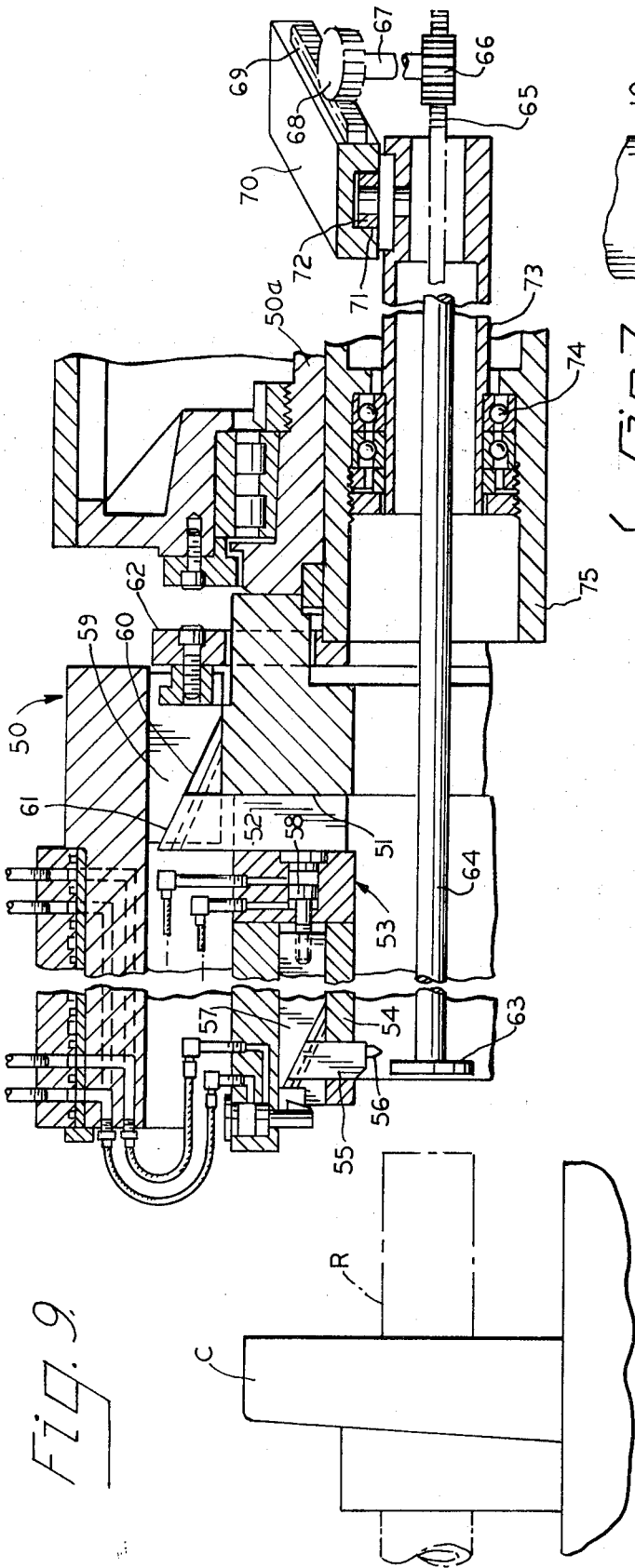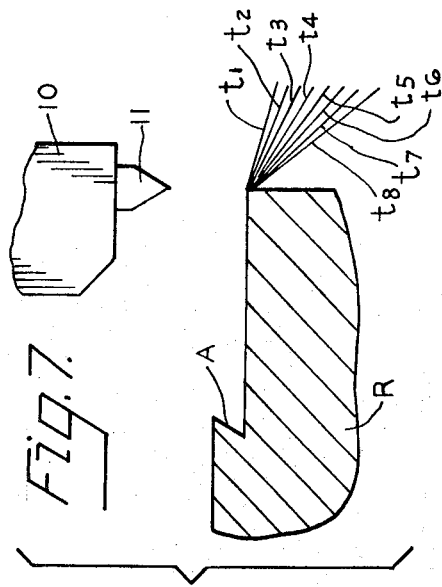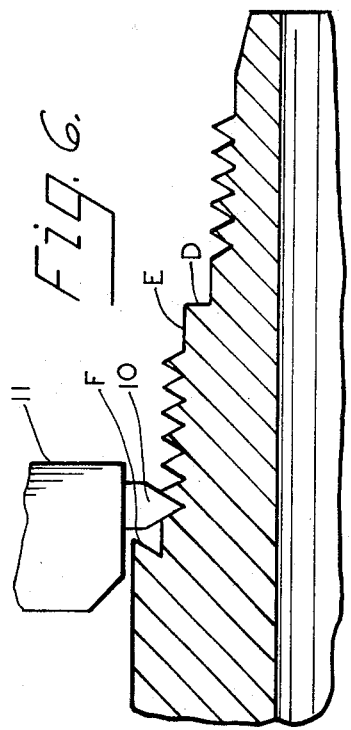

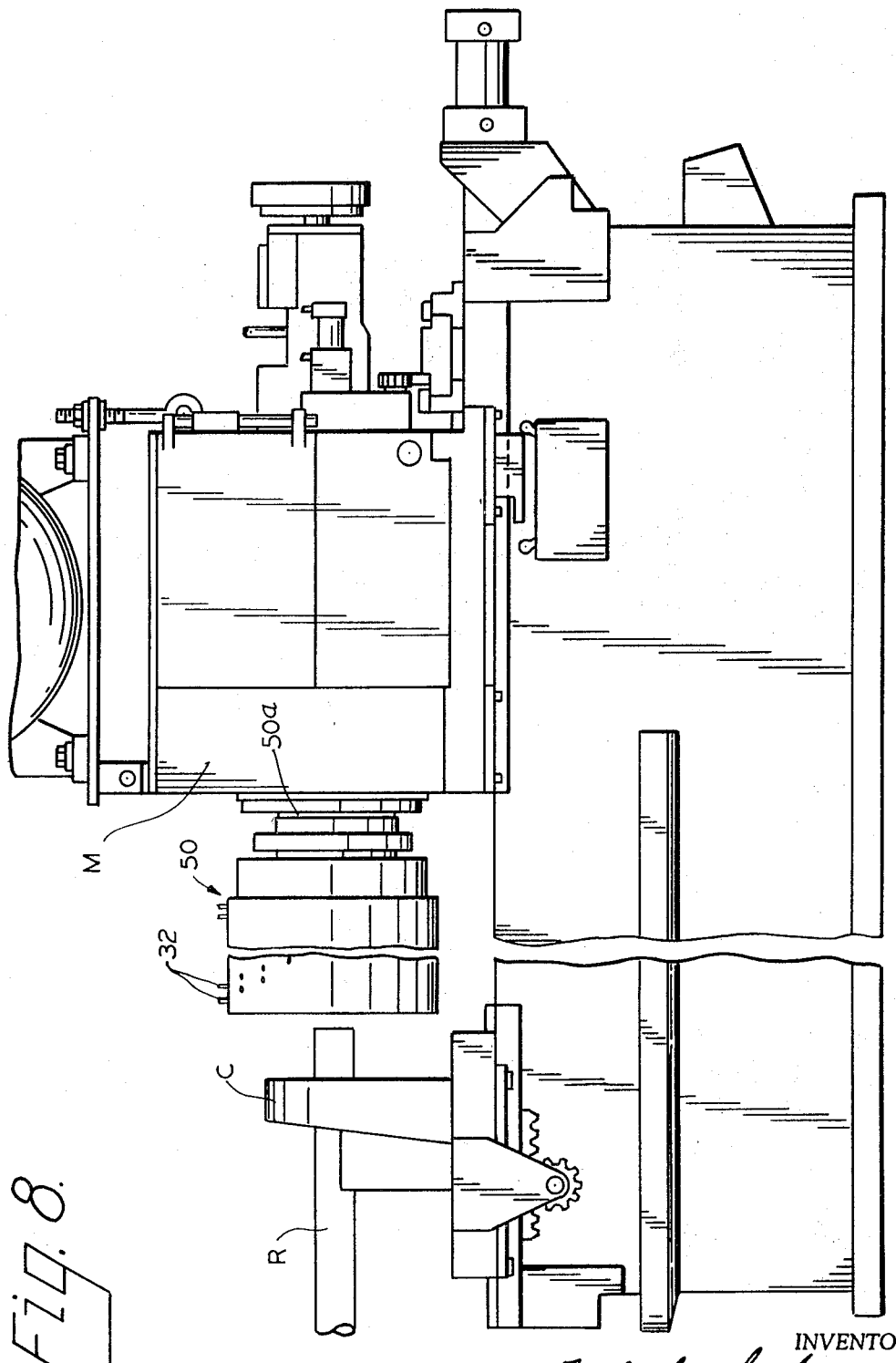

METHOD AND APPARATUS FOR CUTTING THREADS

This invention relates to a die head for cutting on a portion of a workpiece an internal or external surface of preselected contour which terminates closely adjacent to a shoulder on the workpiece which is spaced from the end of the portion.

For purposes of illustration, the invention is disclosed herein as applied to the cutting of external threads on the end of tool holding rods used for holding and rotating drills for drilling oil wells and the like, its uses for other purposes and for cutting internal threads being readily apparent from the illustrative example.

Such a rod is customarily enlarged at one end and in the enlarged portion has a socket which is internally threaded. This end of the rod has a radial shoulder at the open end of the socket. The other end of the rod is externally threaded so that it can be fastened to a duplicate rod by threaded engagement of the externally threaded end with the socket. The externally threaded end has an annular radial shoulder spaced from the end of the rod and so arranged that when two rods are connected, the annular shoulders on the threaded end portion of one rod firmly engages the companion shoulder at the open end of the socket of the duplicate rod.

Heretofore difficulty has been encountered in cutting the external threads substantially to the shoulder from the end of the rod or from the shoulder to the free end of the rod. Generally external threading is done by multitooth chasers. As a result, the thread cannot be formed so as to be substantially its full depth up to a point very closely adjacent the shoulder. Instead the runout must begin two or three convolutions from the shoulder in a direction toward the adjacent end of the rod, depending upon the number of teeth in each chaser.

The present invention is directed to a die head by which the threading of the externally threaded rod end can be begun at a location spaced from the shoulder; for example, at the end of the rod, and completed at the shoulder, or can be begun at the shoulder and completed at a location spaced from the shoulder; for example, by running off of the end of the rod. In each case the thread can be substantially its full depth to a point more closely adjacent the shoulder than was heretofore possible with conventional multitooth chasers.

The approach to the shoulder can be as close as could be obtained by using a lathe and making a series of passes to cut the thread; for example, by making one cut for the full length of the threaded portion, backing up and making a second cut in the thread, and so on until a full depth thread is formed. In the present instance, instead of successive passes and repeated resettings of a single tool, the present die head is arranged so that all passes, each by a single tooth cutter, are effected concurrently.

Various specific objects and advantages will become apparent from the following description wherein reference is made to the drawings, in which:

FIG. 4 is a cross-sectional view of the structure illustrated in FIG. 3, taken on the line 4—4 of FIGS. 1 and 3, part thereof being shown in elevation for clearness in illustration;

FIG. 5 is a fragmentary diagrammatic illustration showing the hydraulic circuitry for operating the wedge blocks and stops;

FIG. 6 is an enlarged diagrammatic fragmentary cross sectional view of a rod, showing a typical thread that can be formed by the present invention, showing the relation of the cutting tools and its carrier to the shoulder on the rod illustrated in FIG. 5;

FIG. 7 is a diagrammatic illustration showing the relation of the cuts made by the successive tools or chasers;

FIG. 8 is a fragmentary side elevation of a thread cutting machine and a modified die head of the present invention connected thereto; and FIG. 9 is an enlarged vertical sectional view of the structure illustrated in FIG. 8, part thereof being shown in longitudinal section, and part diagrammatically, for clearness in illustration.

Figure 1:
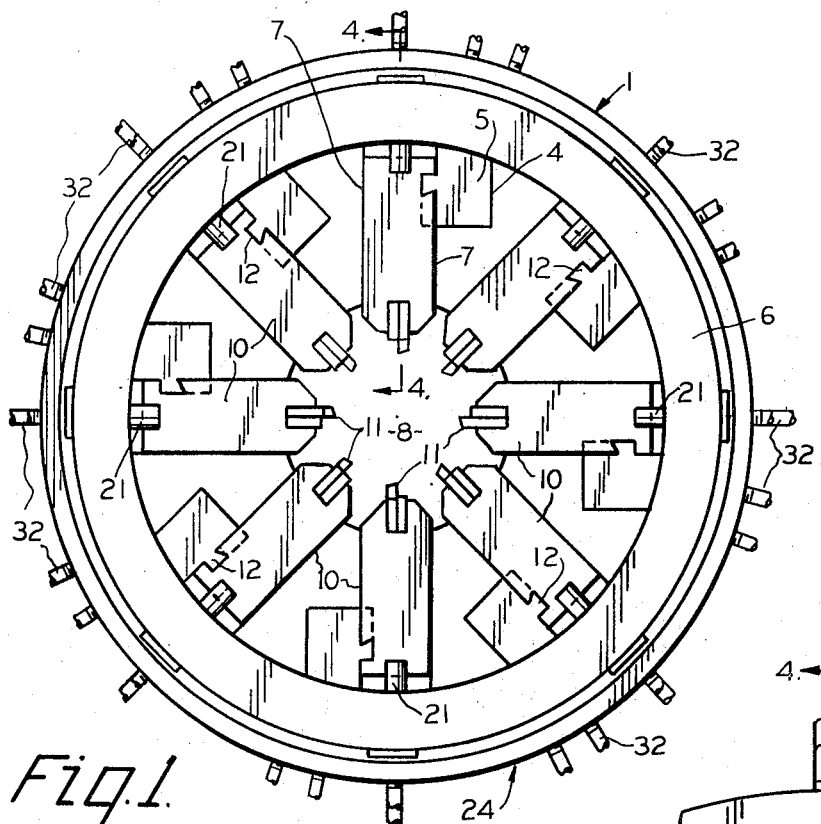
FIG. 1 is a front elevation of a die head embodying the principles of the present invention.
Figure 3:
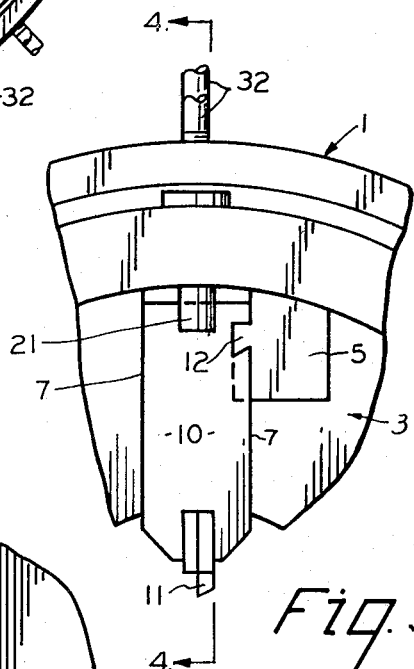
FIG. 3 is an enlarged fragmentary front elevation of the head showing one of the chaser blocks and operating mechanism therefor.
Figure 2:
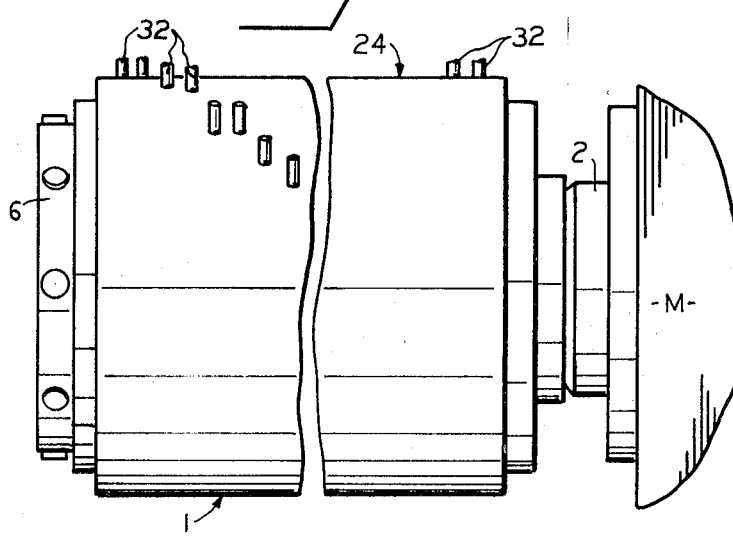
FIG. 2 is a side elevation of the head illustrated in FIG. 1.

Referring to FIGS. 1 through 5, the die head of the present structure, indicated generally at 1, is connected in a conventional manner to, and in coaxial relation with, a spindle 2 of a lathe or thread cutting machine M. The head comprises a body 3 having a series of longitudinal guideways 4 spaced apart circumferentially of the axis of the head and extending endwise thereof. Each guideway is open at the front face of the body 3.

Mounted in each guideway 4 for sliding in a direction parallel to the axis of the head 1 is a wedge block 5. Each wedge block is constrained from radial movement in the guideways and an outer retaining ring 6 is fixedly secured on the body 3.

Extending inwardly from each guideway 4 is radial guideway 7 which is open at its inner end into a central passage or throat 8 of the body 3. Mounted in each radial guideway 7 is a chaser carrier or block 10 which carries a single tooth chaser 11 of a shape required for the particular shape of thread or cut to be made.

Since each combination of wedge block 5, chaser block 10, and the operating means therefor, are identical, only one such combination is described in detail herein.

As more fully described in the U.S. Pat. No. 2,996,736, of William L. Benninghoff, issued Aug. 22, 1961, and U.S. Pat. No. 2,679,057 of Neil T. Sawdey, issued May 25, 1954, each wedge block 5 has a dovetail wedge groove 12 which, in the form illustrated, slopes inwardly toward the axis of the body 3 in a direction from its front end rearwardly of the die head 1. Each chaser block 10 has a complementary dovetail follower 14 which preferably is integral with the chaser block and which connects the chaser block 10 to its associated wedge block 5 so that upon forward movement of the wedge block 5, the chaser block 10 is moved toward the axis of the body 3, and thus toward set position of the tool. Upon movement of the wedge block 12 in the opposite direction, the chaser block 10 is receded outwardly from the axis of the body 3 to a recede or collapse position.

Suitable means are provided for driving the wedge block 10 toward and away from the front position relative to the body. In the form illustrated, this means comprises a reversible piston and cylinder assemblage including a cylinder 15, which may be formed directly in the body 3, in which a piston 16, having a piston rod 17, is reciprocable. The rod 17 is fixedly connected to the block 5 by a suitable means, such as the threaded connection indicated at 18, so that the piston 16 and wedge block 5 move as a unit. The head end of the cylinder is closed by a suitable plug 19.

For positioning and controlling the wedge block in a specific selected position, a movable stop 20 is provided. This stop is arranged so as to be engaged by the front end of the wedge block 5 and arrest or control its forward motion, depending upon whether a straight thread or a tapered thread is to be formed. In order that the stop may be used for either purpose, it is mounted on a piston rod 21 of a piston 22 which is reciprocable in a cylinder 23 of a reversible piston and cylinder assemblage. If desired, the cylinder 23 may be formed in the ring 6.

To supply a pressure fluid to the pistons, a suitable manifold is provided. The manifold 24 includes a collar 25 having at its inner face a plurality of annular channels 26 isolated hydraulically from each other by sealing O-rings 27 and open at the inner face of the collar. The collar is mounted on a bearing sleeve 28 which is fixedly secured on the exterior of the body 3 for rotation therewith. The sleeve body 3 is provided with separate ducts 29, respectively, which extend parallel to the axis of the head and each of which, at its inner end, has a radial duct portion by which it is connected to an associated port 30 in the sleeve 28, and thereby to one of the channels 26. The ducts 29 are arranged in pairs, one pair for each cylinder 16 and one pair for each cylinder 23. The ducts of each pair lead to the opposite ends of their associated cylinder so that when one duct is supplied with pressure fluid its companion duct is vented to sump, and thereby the piston of the associated cylinder is caused to move to extended or retracted position, selectively.

Each pair of channels 26 for a given pair of ducts 29, is connected by hydraulic lines, such as flexible tubes 32, to a reversing valve 33 operated by a solenoid 34. The valve is connected at one side by a pressure line 36 to the pressure side of a pump 37 driven by a motor 38. The other side is connected to a sump S. When the valve 33 is driven in one direction by its solenoid, it supplies fluid pressure to its associated cylinder at one side of the piston head and vents the cylinder at the offside side of the head to the sump S. Thus, each of the pistons 16 is operable independently of the other pistons, and each of the pistons 22 is operable independently of the other pistons.

The solenoids 34 are connected to a timer 40 which may be of the conventional drum or other type and which is set and timed so that it can cause each of the pistons to function in the proper manner relative to the others. Upon admitting pressure fluid to the head end of one of the cylinders 15, the wedge block 12 can be driven to the left in FIG. 4, thus driving the chaser block inwardly toward the axis of the rod or throat 8, and thus toward set position. Upon reversal of this connection, the pressure is applied to the rod ends of the cylinder 15, thus drawing its wedge block 12 to the right in FIG. 4, and thus receding the chaser block from the axis of the rod or throat. For cutting cylindrical threads, the piston 22 is driven to, and remains in, a fixed position so that the stop 20 is stationary relative to the head 1 and body 3.

Each of the chasers or tools 11 is a single tooth tool shaped to cut its particular portion of the cross section of the thread. In the form illustrated in FIGS. 1-5, eight such chaser blocks, each with its single tooth tool, are provided. Assume a cylindrical thread is to be cut beginning at the end of a rod R and cutting toward a shoulder A thereon. The relative advance of the rod and head is dependent, of course, upon the pitch of the thread to be cut, and this advance may be effected by moving the spindle and head axially of the rod which is held stationary in a chuck, as in the above patents, or the spindle and head may be held stationary axially and the rod advanced axially by the chuck into the cutting throat 8.

The wedge blocks 5 are driven by their pistons 16 so as to place the chasers 11 in their innermost or set position. This is accomplished by moving the stops 20 to their selected position radially of the head, usually their innermost positions, and then admitting pressure fluid to the head ends of the cylinders 15. In this position all wedge blocks 5 are moved to the extreme left in FIG. 5, whereby all of the chasers or tools 11 are in a radially innermost position ready for a full depth of cut.

When in this position, the relative advance of the rod and the head 1 is effected. The blocks 10 and their tools 11 are so arranged as to be offset from each other axially or endwise of the rod a sufficient amount such that each tool 11 engages the rod at the end at the same point circumferentially and axially of the rod. Due to this offset of the tools 11 in a direction endwise of the axis of the head 1, each tool, beginning with the initial or leading one of the series and ending with the trailing or final one, are cutting concurrently along the major portion of the length of the thread. During cutting along this portion, each tool leads the other by a predetermined amount. This operation is continued until the shoulder A is very closely approached by the initial or leading tool 11.

As each tool reaches a single given point close to the shoulder A, its retraction or recession from its set position is initiated so that not only do the tools initially engage the rod in sequence, but they also recede in sequence out of cutting relation of the rod to collapsed positions clear of the rod as they approach the shoulder A. They can approach as close as is physically possible with the particular shape and strength of the tool and its manner of connection to its carrier block 10, considering the shape that the tool must have for the particular thread cross section. In timing, arrangements must be made for the fact that the first tool has less radial travel for both setting toward the rod and receding from the rod than do successive preceding tools, to the last tool being most deeply set while cutting. With proper allowance in timing, however, each tool can be set or withdrawn from cutting position and thus enter or leave the surface of the rod very close to, or essentially at the same point circumferentially and axially of the rod as the other tools.

In many instances it is desirable to cut the thread beginning at the shoulder A and proceeding toward or to the end of the rod. If the thread is to be cylindrical, this is accomplished simply be receding all of the chasers so that all of the tools 11 are fully withdrawn radially of the rod to collapsed position. In this position, the end portion of the rod between its end and the shoulder A are positioned for beginning threading. The wedge blocks 5 are in their fully retracted position to the right, thus being fully retracted from the stops 20.

When relative rotation is initiated and the cutting is to begin, the first chaser block 10 and its tool 11 are moved toward set position by moving its wedge block 5 to the left in FIG. 5 until the block 5 engages the preset stop 20 which has been preset in a fixed position relative to the head. This stop 20 is so positioned that the first tool, when its block engages its stop, starts to cut into the rod beginning at a particular point close to the shoulder A. The timing and the setting of the stops 20 are such that as each tool reaches this same point, it begins its movement toward set position, so that each tool in succession moves inwardly and enters the rod in cutting relation at substantially the same point, both axially and circumferentially as each of the others, each in a time delay relation to its predecessor. Allowance in timing is made to compensate for the fact that each tool must move a greater distance radially for a greater depth of the thread section than its immediate predecessor. The cutting is continued until all of the tools reach the end of the portion of the rod to be threaded or pass off of the end of the rod, after which they can each be collapsed or receded fully preparatory to threading the next rod.

Assuming there are eight chasers, chaser No. 1, the one nearest the end of the rod upon starting, would be the first to engage the rod in cutting from the end of the rod toward the shoulder A, and chaser No. 8 would be the last to engage. In cutting in the opposite direction, the order of the chasers would be reversed so that chaser No. 8, the one nearest the end of the rod upon starting, would enter the rod first and chaser No. 1 would be the last to enter and leave the end of the rod.

This last-mentioned approach can be used for cutting a tapered thread beginning at the shoulder and cutting toward the end of the pipe. For this purpose the stop 20 is arranged with a taper, as indicated at 41, this taper being such that as the piston 22 is gradually retracted outwardly radially, the wedge surface 41 permits the wedge block 5 to move farther to the left in proportion to the outward movement of the piston 22. Thus during the forming of the thread from its initiation at the shoulder A, each piston 22 is receded gradually, depending upon its degree of taper, so that its associated wedge block 5 moves gradually to the left in FIG. 5. Thereupon the tool 11 moves farther in toward the axis of the rod as the tool advances toward the end of the rod, thus providing a tapered thread.

At the end of the operation of each tool, its associated piston 16 is suddenly receded so that its associated wedge block 5 is moved far enough to the right to move the tools to collapsed condition preparatory to threading the next rod.

In this instance, likewise, each tool 11 completes its cutting operation at the same point as the others, both circumferentially and axially of the rod.

If the thread is to be cut in a direction from the end of the rod toward the shoulder A, the stops 20 are moved to outermost set position so that when the blocks 5 are forced thereagainst by the pistons 16, the tools will be in their innermost positions. When cutting by each tool 11 is initiated, its stop 20 is moved gradually inwardly toward the rotational axis with sufficient force to overcome the associated piston 16 and thus gradually drive the block 5 to the right, thereby moving the tool block 10 and tool 11 gradually outwardly so that a tapered thread of pitch diameter which increases gradually from the rod end toward the shoulder A is produced.

In some instances it is desirable to cut a thread, as illustrated in FIG. 6, of one pitch diameter extending part way from one end of the rod toward the opposite end and terminating close to a shoulder D and then, beyond the shoulder in the same direction, leave a smooth cylindrical surface E, and therebeyond a thread having a larger diameter and extending to a shoulder F.

For this purpose, the stop 20 may be moved from one adjusted position to a second adjusted position. For example, assume the larger diameter thread is to be first cut, beginning at the shoulder F, to be followed by the surface E, and then the smaller diameter thread. If the stops 20 are moved to their innermost positions, the tools 11 are in their outermost set positions ready for cutting the first thread of the larger pitch diameter. When this thread is completed the pistons 22 are retracted a predetermined distance, setting the stops 20 for clearing the surface E.

After each tool has passed the surface E in a direction toward the end of the rod, its stop is farther retracted so that its piston 16 moves the associated block 5 farther to the left in FIG. 5, thereby moving the tools successively inwardly to provide the cuts for forming the smaller diameter thread.

On the other hand, if one starts at the end of the rod and works toward the surface E and shoulder F, then the stops 20 would be moved outwardly toward the axis as fully as possible initially so that the wedge blocks 5 set the tools for the smaller diameter thread. When the shoulder D is reached, then the stops 20 would be moved inwardly, thus allowing the tools to be set by the pistons 16 for clearing the surface E. When this surface is passed, the stops 20 are moved farther inwardly, thus receding the tools outwardly for the larger diameter thread. This can be done repeatedly depending upon the number of shoulders and surfaces to be provided.

As illustrated in FIG. 7, as each tool 11 is set into or runs out of the rod R, depending on the direction of advance axially of the rod, the angle of its path relative to the axis of the rod is different from the angles of the paths of the other tools. These paths are indicated at t, through $t_8$, corresponding to the order of application of the tools. These angles usually range from about 5° to the axis for the leading tool 11 making the shallowest cut to about 45° for the trailing tool 11 making the final cut and thus more deeply beneath the original pipe surface.

Instead of cutting tapered threads in this manner, the arrangement shown in FIGS. 8 and 9 may be employed. As there shown, a die head 50 is mounted on the spindle of a tapered thread cutting rotary spindle machine such as disclosed in the above identified patents.

A rod R is secured in fixed position by a suitable chuck C and the spindle and die head are moved axially of the rod.

As described in detail in the above U.S. Pat. No. 2,996,736, the machine is provided with a spindle head 50a which is rotatably driven about its axis. Mounted in suitable circumferentially spaced radial slideways 51 in the head for sliding radially therein are suitable carriers 52, respectively. Each carrier 52 supports a tool unit 53 which is the same as the unit described in FIGS. 1 through 5, the only difference being that each of the units 53 is mounted on a separate one of the carriers 52 instead of fixedly on the die head. Each unit 53 comprises a body 54 on which a chaser block 55 is mounted for reciprocation radially. Each block 55 carries a single tooth cutting tool 56. The block 55 is operated by a wedge block 57 driven, in turn, by a piston and cylinder assemblage, indicated generally at 58 and comparable in all respects to that for operating the wedge block 5 heretofore described in connection with FIGS. 1 through 5. The structure is operated in the same manner as that heretofore described unless a tapered thread is desired. In such case, the units 53 are moved radially in the same direction concurrently at the same rate, this movement being entirely independent of the operation of their respective piston and cylinder assemblages 58.

For receding the chasers concurrently for forming a tapered thread, each carrier 52 is drivingly connected by a wedge block 59 which has a sloping groove 60 on which a corresponding rib 61 on the carrier 52 is provided. Thus, in the form illustrated in FIG. 9, as the wedge block 59 is moved to the right it recedes the entire unit 53 radially outwardly, and if it is moved to the left it moves the entire unit toward the axis of the pipe.

The wedge blocks 59 are connected to a common drive flange 62 which is supported on the die head for movement axially thereof relative thereto and for rotation therewith. As described in the above U.S. Pat. No. 2,996,736, for moving the flange 62 in a direction to recede the tools, a suitable abutment 63 is positioned to be engaged by the end of the rod at the instant that cutting is initiated by the first one of the tools 56 and to be pushed thereby to the right in FIG. 9, either by movement of the spindle head to the left or movement of the chuck to the right. In the form illustrated, this is effected by movement of the spindle head to the left while the rod R is held stationary in the chuck C.

The abutment 63 is mounted on a rod 64 which, at the end remote from the abutment 63, carries a rack 65, as diagrammatically indicated in FIG. 9. The rack 65 drives a pinion 66 mounted on a shaft 67 which carries at its opposite end another pinion 68. The pinion 68 drivingly engages the rack 69 on a sine bar 70. The sine bar 70 is provided with a groove 71 which operates a follower 72. The follower 72 is connected to a tubular member 73 which through the medium of antifriction bearings 74 is drivingly connected to a hub 75 on the flange 62. Thus, as the rod pushes the abutment 63 to the right relative to the spindle head, the flange 62 is receded in a fixed timed relation thereto which is adjustable to that required for the particular rate of taper. The carriages 52, and thereby the tools 56, once they are moved to set position, are receded concurrently as they advance from the end of the rod engaged by the abutment 63 toward the opposite end. At the end of the cut, the tools 56 can be collapsed successively by the piston and cylinder assemblage and then concurrently by the recede mechanism described.

It is apparent from the foregoing that threads or other surface contours can be cut very close to generally radial shoulders on rods, or on pipes and other workpieces, beginning at the shoulder or at the end of the rod, and that different diameter threads with unthreaded portions therebetween, can be produced readily. In each case, the threads can be straight or tapered.

Having thus described my invention, I claim:

1. The method of cutting a surface of predetermined contour on a portion of a workpiece so that the inner end of the surface is closely adjacent a shoulder on the workpiece and comprising:

effecting relative rotation between a series of individual, concurrently operating cutting tools concurrently and a workpiece about the axis of the surface to be cut;

initially applying the tools in succession in cutting relation to the workpiece in a time-delay relation to each other;

advancing the tools generally endwise of the axis at the same rate, each from the time of its initial application until its withdrawal from the workpiece;

continuing the cutting relation with all tools concurrently along the portion of the workpiece on which the contour is to be formed; and withdrawing the tools in succession from the workpiece in a time-delay relation to each other.

2. The method according to claim 1 wherein the tools are applied in succession by moving them parallel to the axis of said surface and are withdrawn in succession by withdrawing them radially of said surface as each approaches closely adjacent said shoulder.

3. The method according to claim 1 wherein the tools are set in succession adjacent the shoulder by radial movement and are withdrawn in succession from said surface by movement endwise of the surface.

4. The method according to claim 1 wherein the tools are single tooth thread cutting tools, respectively.

5. The method according to claim 1 wherein each tool of the series from the first to the last initially engages the portion to be threaded at the same starting point axially and circumferentially of the portion.

6. The method according to claim 1 wherein the time-delay relation is such that each tool, in order from first to last, is disengaged from said portion at the same finish point axially of the portion and very close to the same point circumferentially of the portion.

7. The method according to claim 1 wherein each tool of the series, from the first to the last, initially engages the portion to be contoured at the same starting point axially and close to the same point circumferentially of the portion;

the time-delay relation is such that each tool in order from first to last is disengaged from said portion at the same finish point axially of the portion and very close to the same point circumferentially of the portion; and the starting point is at the outer end of the portion and each tool is initially engaged with said portion at the starting point for its full depth of cut, and each tool is run out near the end of its cut at the other end of the portion so as to be withdrawn from the portion at substantially the same finish point as each preceding tool.

8. The method according to claim 1 wherein the contour to be cut is tapered and, when all tools are in full cutting relation, all are moved concurrently radially of the axis at the same rate throughout a predetermined advance of the tools relative to the portion being contoured.

9. The method according to claim 1 wherein the starting point is spaced from the end of the portion toward which the tools are to advance during cutting, and each tool is initially engaged at the starting point and set to its full cutting depth within less than a complete revolution about the axis of the portion.

10. The method according to claim 9 wherein the thread to be cut is tapered and after all the tools are in full cutting relation, all are moved toward the axis of said portion concurrently at the same speed throughout a predetermined length of said portion.

11. The method according to claim 1 wherein said portion is to have two threads separated by a shoulder and after withdrawal of the tools from the portion they have threaded, they are so positioned as to reduce the outside diameter of the portion to provide an intermediate shoulder, and while so doing are advanced to a new starting position adjacent the shoulder;

the tools are next applied in succession in cutting relation to the part of said portion beyond the shoulder successively in a time-delay relation to each other from the first of the series to the last of the series and each initially engages the port of the portion beyond the shoulder at substantially the same starting point axially and circumferentially of said part.

12. An apparatus for cutting a surface of predetermined contour on a portion of a workpiece so that the inner end of the surface is closely adjacent a generally radial shoulder on the workpiece and comprising - a cutting head having a central passage therein with its axis extending endwise thereof;

a plurality of single tooth cutting tools mounted in the head in spaced relation to each other about the axis, each of said tools being further mounted for movement in a direction inwardly toward and outwardly away from said axis independently of the others;

power means for each of said cutting tools, each power means being operable to move its associated tool inwardly and outwardly independently of the other tools, and including means for moving the tools in one of said directions in succession, beginning with the first of the series, each in a time-delay relation to the one preceding it, and to move the tools in the other of said directions in succession, beginning with the first of the series, each in a time-delay relation to the one immediately preceding it.

13. The structure according to claim 12 wherein additional means are provided to cause all of said tools to move in one of said directions concurrently after they have been moved to a starting position and until they have reached a final cutting position.

14. The structure according to claim 12 wherein said last mentioned means include stops for the tools, respectively, each stop having an abutment surface which determines the position to which the tool is moved in one of said directions by the power means;

each of said stops has a sloping abutment surface against which the tool bears; and each stop is movable by power means to progressively change the portion of the surface against which the tool abuts so as to control its movement in said one of said directions.

* * * * *